UNITED STATES PATENT OFFICE.

MOSES LUCE, OF ELLINGTON, NEW YORK, ASSIGNOR OF ONE-TENTH TO JAY E. NOBLE, OF SINCLAIRVILLE, NEW YORK.

PROPELLING MECHANISM FOR VEHICLES.

1,204,799.  Specification of Letters Patent.  Patented Nov. 14, 1916.

Application filed September 30, 1912. Serial No. 723,191.

*To all whom it may concern:*

Be it known that I, MOSES LUCE, a citizen of the United States, residing at Ellington, in the county of Chautauqua, State of New York, have invented certain new and useful Improvements in Propelling Mechanism for Vehicles; and I do hereby declare the following to be a full, clear, and exact description of the invention, such as will enable others skilled in the art to which it appertains to make and use the same.

This invention relates to improvements in propelling mechanisms for vehicles.

The principal object of the invention is to provide a propelling mechanism of novel construction which may be readily substituted for the wheels of an automobile or other vehicle.

Another object of the invention is to provide a propelling mechanism which will insure a greater tractive power than the ordinary vehicle wheel.

A further object of the invention is to provide a propelling mechanism of the character described which is composed of a minimum number of parts, is therefore simple in construction and is cheap to maufacture.

With these and other objects in view, the invention consists in the construction and novel combination of parts hereinafter fully described, illustrated in the accompanying drawing and pointed out in the claim hereto appended; it being understood that various changes in the form, proportion, size and minor details of construction within the scope of the claim may be resorted to without departing from the spirit or sacrificing any of the advantages of the invention.

Figure 1:
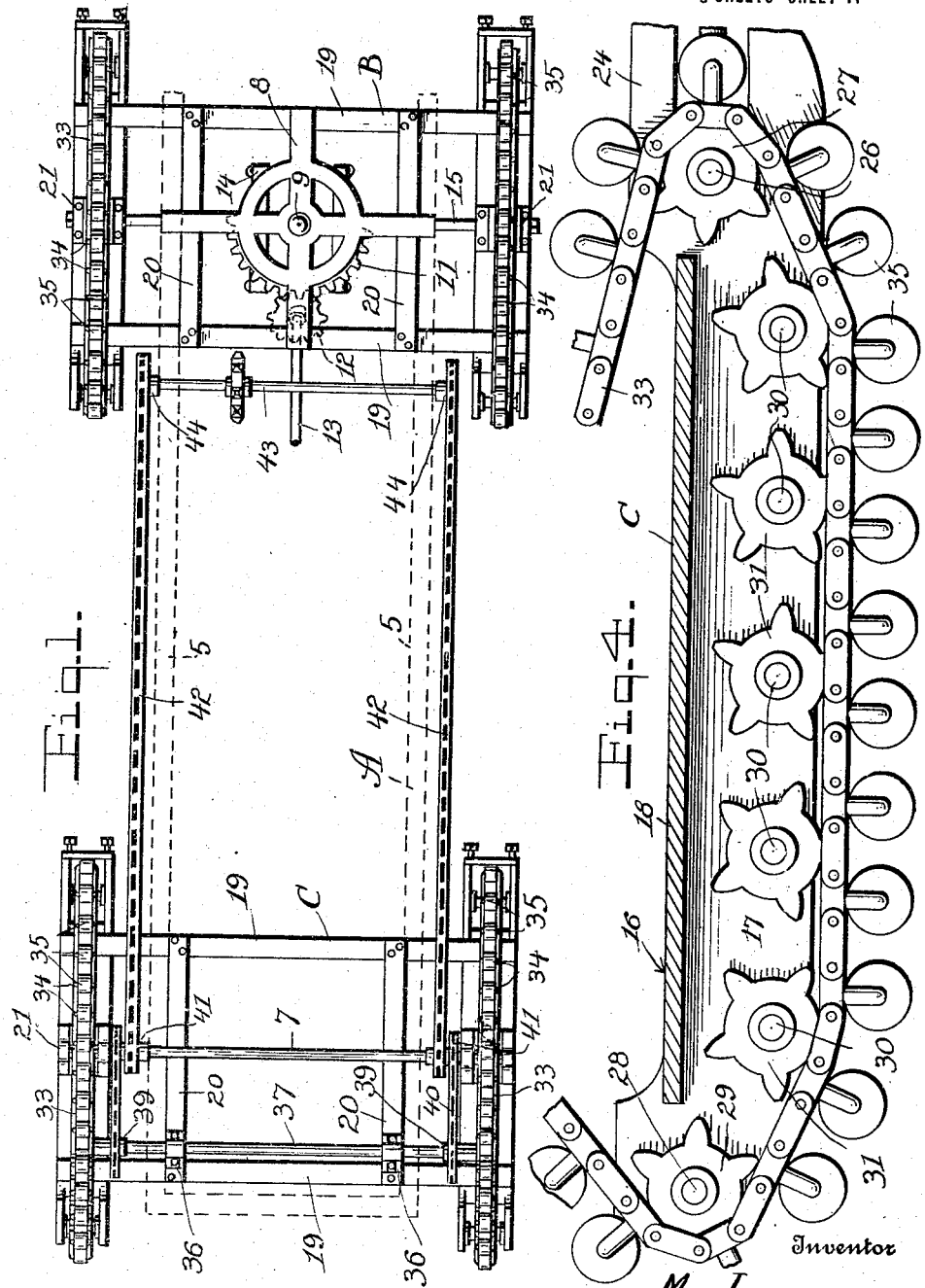
Figure 2:
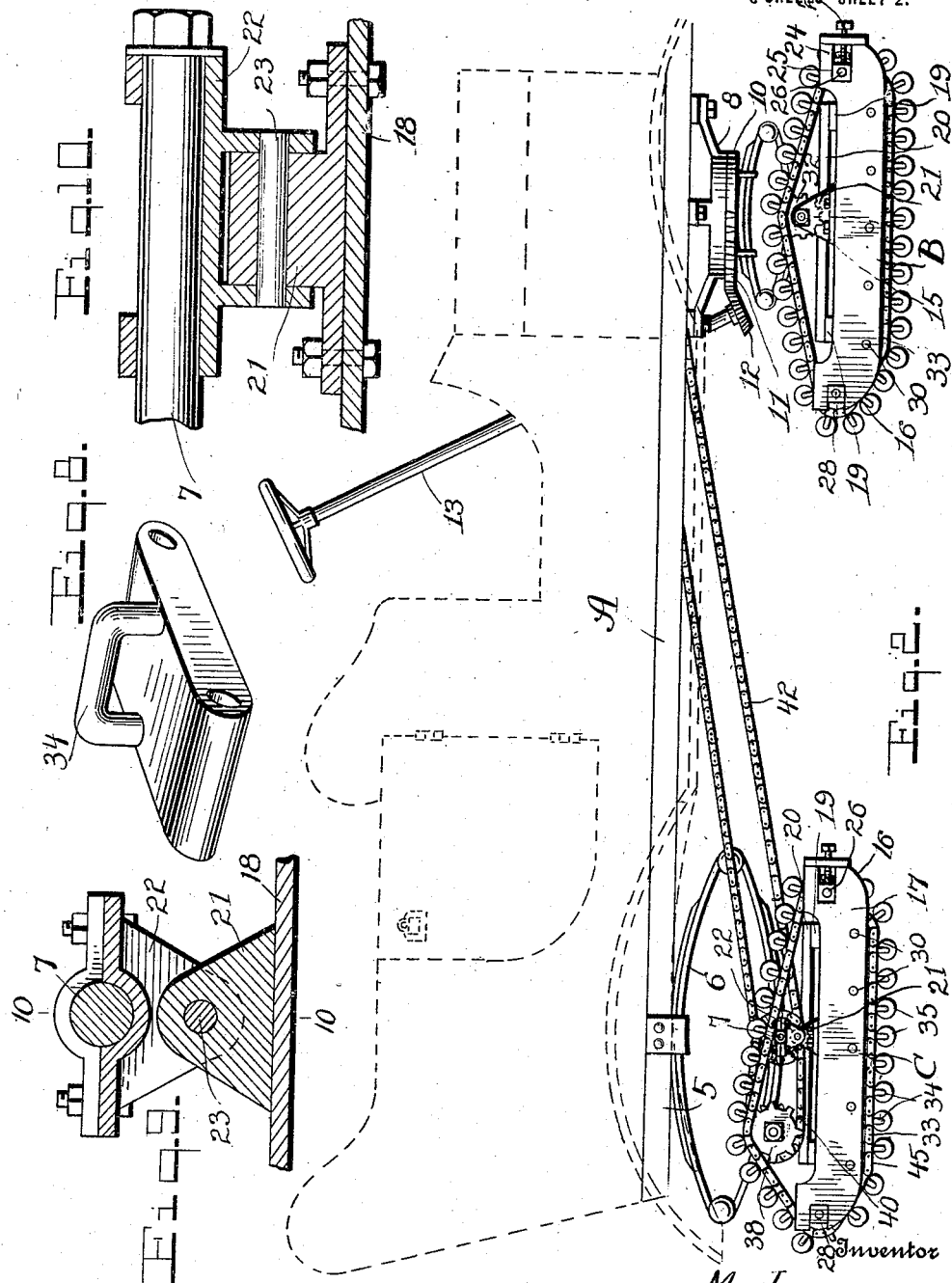
Figure 3:
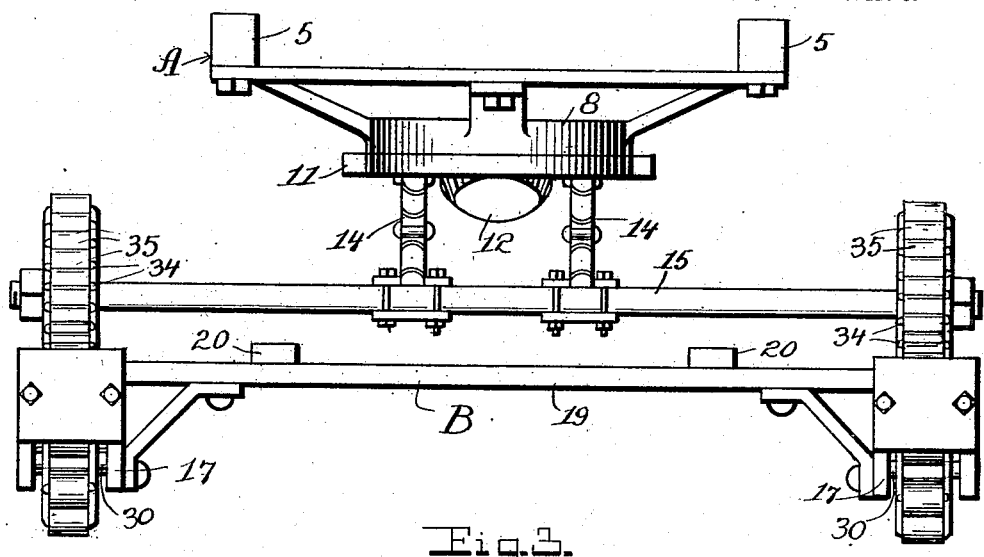
Figure 6:
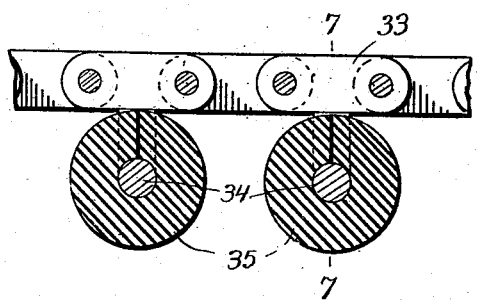
Figure 7:
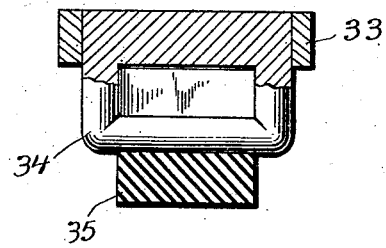
Figure 5:
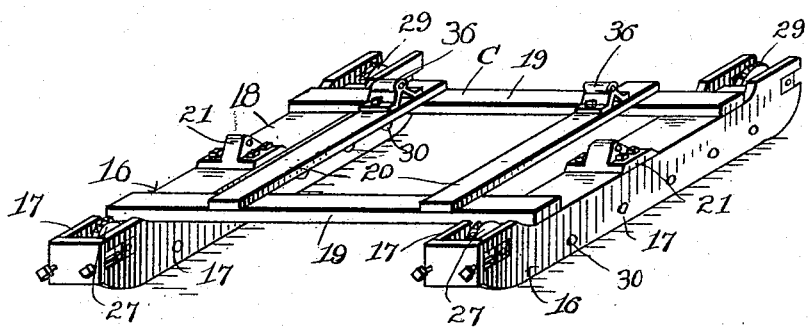

In the drawing: Figure 1 is a top plan view showing the chassis of a motor vehicle showing the application of a propelling mechanism constructed in accordance with my invention, Fig. 2 is a side elevation thereof, the body of the vehicle being shown in dotted lines, Fig. 3 is a detail front end view thereof, Fig. 4 is an enlarged longitudinal sectional view through one of the tractor shoes, Fig. 5 is a perspective view of the rear bob, Fig. 6 is an enlarged detail sectional view through the sprocket chain, Fig. 7 is a transverse sectional view taken on the line 7—7 of Fig. 6, a portion thereof being shown in elevation, Fig. 8 is a perspective view of one of the chain links, Fig. 9 is a detail sectional view showing the pivotal connection between a bob and axle, and Fig. 10 is a cross sectional view taken on the line 10—10 of Fig. 9, parts thereof being shown in elevation.

Referring to the drawings, A designates the frame of an automobile which includes the usual side sills 5—5. Disposed below the frame and secured to the rear end thereof by means of springs 6 is the rear axle 7, and secured to the underface of the forward end of the frame is a bearing 8, and to this bearing is pivotally connected by means of a king-bolt 9 a fifth-wheel 10, which is formed on its rear edge with a segmental gear 11 which is engaged by a pinion 12 carried by a steering post 13. Depending from the fifth-wheel 10 are longitudinal springs 14—14 which support a rigid front axle 15.

My invention comprises front and rear bobs B and C. Each bob includes a spaced pair of parallel shoes 16—16 of inverted channel iron construction. Each shoe includes spaced side walls 17—17 and a top 18, the ends of the walls extending beyond the ends of the top. The shoes are connected by spaced transverse frame members 19—19 which are in turn connected by spaced longitudinal frame members 20—20. Centrally fixed on the top 18 of each shoe of both bobs is a transverse bearing 21. The rear axle 7 is pivotally connected to the bearings 21 of the rear bob C by means of bearings 22—22 which are secured to the rear axle and which are connected to the bearings 21 through the medium of pivot pins 23.

The bearings 21 of the front bob B are directly pivoted to the spindles of the front axle 15. At one end of each shoe the side walls 17 are formed with inwardly extending slots 24, and mounted in each slot is a slidable bearing 25 which is adjusted by means of a screw 25' of ordinary construction. These bearings support a transverse axle 26, and upon this axle is loosely mounted a sprocket wheel 27. The walls 17 of each bob support at its other end a transverse axle 28, and upon this axle is loosely mounted a sprocket wheel 29. Supported by the side walls 17 of each shoe between the sprocket wheels 27 and 29 are transverse axles 30, and loosely mounted upon each axle are idler sprocket wheels 31, the teeth thereof operating below the lower edges of the side walls 17.

The bearings 21 of the front bob B are split and loosely mounted on the spindles of the front axle and within the bearings are sprocket wheels 32. A sprocket chain 33 is trained around the sprocket wheels 27, 29, idler sprocket wheels 31 and the sprocket wheel 32. Every other link of the chain 33 is formed with an offset transverse bar 34, and upon these bars are fixed ground rollers 35.

Carried by the longitudinal frame members 20 of the rear bob C are transverse bearings 36—36, and these bearings support a countershaft 37. Fixed on the ends of this countershaft are sprocket wheels 38—38, and also fixed on the shaft intermediate the wheels 38 are sprocket wheels 39—39 over which are trained sprocket chains 40—40 which are driven from the sprocket wheels 41—41 fixed on the rear axle 7. The sprocket wheels 41 are driven by chains 42—42 from a motor operated countershaft 43 through the medium of the sprocket wheels 44—44, said shaft 43 being driven from a motor (not shown) by any suitable means. Trained around the sprocket wheels 27 and 29, idler sprocket wheel 31 and the sprocket wheels 38 of the rear bobs C are chains 45 which are identical in construction to the chains 33 above noted.

In operation, the shaft 42 will, through the chains 42 impart movement to the rear axle 7, and this axle will through the medium of the chains 40 transmit motion to the countershaft 37 which will in turn, through the medium of the sprocket wheels 38, drive the chains 45, and thereby propel the vehicle.

What is claimed is:

An endless propelling chain adapted to move around a bob shoe comprising a plurality of pivotally connected links, certain of said links being formed with transverse offset bars, and ground rollers fixed on said bars.

In testimony whereof, I affix my signature, in presence of two witnesses.

MOSES LUCE.

Witnesses:
  CHAS. MCALLESTER,
  LEVI LUCE.